United States Patent
Haga

(10) Patent No.: US 10,601,308 B2
(45) Date of Patent: Mar. 24, 2020

(54) POWER FACTOR IMPROVING CONVERTER, AND POWER SUPPLY DEVICE INCLUDING POWER FACTOR IMPROVING CONVERTER

(71) Applicant: SHINDENGEN ELECTRIC MANUFACTURING CO., LTD., Hanno-shi, Saitama (JP)

(72) Inventor: Hiroyuki Haga, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/329,364

(22) PCT Filed: Aug. 29, 2014

(86) PCT No.: PCT/JP2014/072778
§ 371 (c)(1),
(2) Date: Jan. 26, 2017

(87) PCT Pub. No.: WO2016/031061
PCT Pub. Date: Mar. 3, 2016

(65) Prior Publication Data
US 2017/0222545 A1  Aug. 3, 2017

(51) Int. Cl.
*H02M 1/42* (2007.01)
*H02M 1/08* (2006.01)
(Continued)

(52) U.S. Cl.
CPC .............. *H02M 1/42* (2013.01); *H02M 1/08* (2013.01); *H02M 3/33523* (2013.01);
(Continued)

(58) Field of Classification Search
CPC . H02M 7/12; H02M 7/219; H02M 2001/0074
See application file for complete search history.

(56) References Cited

U.S. PATENT DOCUMENTS

| 7,359,224 B2 * | 4/2008 | Li ............................ G05F 1/565 363/89 |
| 2004/0047167 A1 | 3/2004 | Prasad et al. |

(Continued)

FOREIGN PATENT DOCUMENTS

| CN | 102055348 A | 5/2011 |
| CN | 102130608 A | 7/2011 |

(Continued)

OTHER PUBLICATIONS

Translation of C.N.-103280994 (Year: 2013).*
(Continued)

*Primary Examiner* — Rexford N Barnie
*Assistant Examiner* — Elim Ortiz
(74) *Attorney, Agent, or Firm* — Nixon & Vanderhye P.C.

(57) ABSTRACT

Provided are a plurality of circuit blocks each including: a first series circuit including a first rectifying element and a first switching element which are connected in series; a second series circuit including a second rectifying element and a second switching element which are connected in series; and a capacitor, wherein output terminals are connected to both ends of the first series circuit, both ends of the second series circuit, and both ends of the capacitor. Input terminals of the respective circuit blocks are connected in series. An AC power source is connected thereto via a choke, thereby solving the problem.

17 Claims, 11 Drawing Sheets

(51) Int. Cl.
*H02M 3/335* (2006.01)
*H02M 7/25* (2006.01)
*H02M 3/28* (2006.01)
*H02M 1/00* (2006.01)

(52) U.S. Cl.
CPC ............ *H02M 7/25* (2013.01); *H02M 1/4225* (2013.01); *H02M 1/4233* (2013.01); *H02M 3/285* (2013.01); *H02M 2001/007* (2013.01); *H02M 2001/0074* (2013.01); *Y02B 70/126* (2013.01); *Y02P 80/112* (2015.11)

(56) References Cited

U.S. PATENT DOCUMENTS

| | | | | |
|---|---|---|---|---|
| 2006/0007716 | A1* | 1/2006 | Takahashi | H02M 7/219 363/89 |
| 2011/0170325 | A1* | 7/2011 | Jungreis | H02M 7/219 363/127 |
| 2013/0063981 | A1* | 3/2013 | Dujic | H02M 1/4233 363/16 |

FOREIGN PATENT DOCUMENTS

| | | | |
|---|---|---|---|
| CN | 103280994 | A * | 9/2013 |
| CN | 103280994 | A | 9/2013 |
| CN | 103346674 | A | 10/2013 |
| JP | 11-356051 | | 12/1999 |
| JP | 2003-348849 | | 12/2003 |

OTHER PUBLICATIONS

International Search Report for PCT/JP2014/072778 dated Dec. 2, 2014, one (1) page.

Xinghua et al., "A Novel DC-Link Voltages Balancing Control Method for Cascaded H-Bridge Rectifier," China Academic Journal Electronic Publishing House, Transactions of China Electrotechnical Society, vol. 26, No. 8, Aug. 2011, 86-87, with English Abstract (7 pages).

First Office Action dated Jun. 21, 2018 in Chinese Application No. 201480081267.6, with English translation (18 pages).

Second Office Action dated Jan. 9, 2019 in Chinese Application No. 201480081267.6, with English translation (22 pages).

* cited by examiner

US 10,601,308 B2

POWER FACTOR IMPROVING CONVERTER, AND POWER SUPPLY DEVICE INCLUDING POWER FACTOR IMPROVING CONVERTER

This application is the U.S. national phase of International Application No. PCT/JP2014/072778 filed Aug. 29, 2014, the entire content of which is hereby incorporated by reference.

TECHNICAL FIELD

The present invention is an application of the multilevel converter technology to non-isolated power factor improving converters, and particularly relates to cascade multi-cell multilevel converters.

BACKGROUND ART

Conventionally, as power factor improving converters, systems using the boost chopper circuits are well known. FIG. 15 shows a circuit diagram of this system. A diode 21, a diode 22, a diode 23, and a diode 24 are bridge-connected, an input thereof is connected to an AC power source 1, and an output thereof is connected to a series circuit including a choke 2 and a MOSFET 37. A series circuit including a diode 25 and a capacitor 54 is connected between a source and a drain of the MOSFET 37, and a load 3 is connected to both ends of the capacitor 54.

Since the power factor improving converter receives an input current obtained by a filter (not shown) removing a high frequency component from a current of the choke 2, a control is performed so that a low frequency component of the current of the choke 2 becomes similar in waveform to the voltage of the AC power supply 1, thereby realizing the power factor improving function.

The current of the choke 2 can be controlled by turning on and off the MOSFET 37. When the MOSFET 37 is turned on, a voltage of the MOSFET 37 becomes zero. When the MOSFET 37 is turned off, the diode 25 becomes conducted. Therefore, the voltage of the MOSFET 37 becomes equal to a voltage of the capacitor 54, that is, an output voltage.

Accordingly, an equivalent circuit of FIG. 15 focusing on a change in voltage of the choke 2 will be a circuit shown in FIG. 16. Here, a variable voltage source 4 has a value of ±mVo where Vo represents the output voltage. m has a value of 0 or 1, a sign will be positive when the voltage of the AC power supply 1 is positive, and the sign will be negative when the voltage of the AC power supply 1 is negative. Here, a state where an upper side of the AC power supply 1 is higher in potential than a lower side thereof is defined as a positive voltage, while the reverse state is defined as a negative voltage.

Since this circuit is a boost chopper, it is premised that the output voltage is higher than the input voltage. Therefore, when m=0, that is, the MOSFET 37 is turned on, the current of the choke 2 increases. When m=1, that is, the MOSFET 37 is turned off, the current of the choke 2 decreases. It is possible to control the current of the choke 2 by controlling a ratio of the on-off, thus enabling a control such that the input current of the power factor improving converter becomes similar in waveform to the voltage of the AC power supply 1.

On the other hand, a circuit of FIG. 17 is known as a circuit that realizes the same operation as the above. Here, when the same components as those of the circuit shown in FIG. 15 are represented by the same symbols, a MOSFET 38, a MOSFET 39, a MOSFET 40, and a MOSFET 41 are bridge-connected, an input thereof is connected to the AC power supply 1 via the choke 2, an output thereof is connected to a capacitor 54, and the load 3 is connected to both ends of the capacitor 54.

It is apparent in the circuit shown in FIG. 17 that when all the MOSFETs are turned on, it becomes equal to the state where m=0 in the circuit shown in FIG. 16. Additionally, when all the MOSFETs are turned off, body diodes of the respective MOSFETs constitute the bridge diode, and its rectifying action makes the circuit equal to the state where m=1 in the circuit shown in FIG. 16. Accordingly, similarly to the circuit shown in FIG. 15, it is possible to make the circuit shown in FIG. 17 function as a power factor improving converter.

Additionally, two of the MOSFET 38, the MOSFET 39, the MOSFET 40, and the MOSFET 41 are replaceable with diodes, such as known as circuits shown in FIG. 18 and FIG. 19.

It is apparent in the circuit shown in FIG. 18 that when the MOSFET 40 and the MOSFET 41 are turned on, it becomes equal to the state where m=0 in the circuit shown in FIG. 16. Additionally, when the MOSFET 40 and the MOSFET 41 are turned off, the diode 26, the diode 27, the body diode of the MOSFET 40, and the body diode of the MOSFET 41 constitute the bridge diode, and its rectifying action makes the circuit equal to the state where m=1 in the circuit shown in FIG. 16. Accordingly, similarly to the circuit shown in FIG. 15, it is possible to make the circuit shown in FIG. 18 function as a power factor improving converter.

In the circuit shown in FIG. 19, if the MOSFET 39 is turned on while the AC power supply 1 is at the positive voltage, a current flows in a route from the choke 2 via the diode 26 to the MOSFET 39, it becomes equal to the state where m=0 in the circuit shown in FIG. 16. Additionally, if the MOSFET 41 is turned on while the AC power supply 1 is at the negative voltage, a current flows in a route from the MOSFET 41 via the diode 28 to the choke 2, it becomes equal to the state where m=0 in the circuit shown in FIG. 16. Further, if the MOSFET 39 and the MOSFET 41 are turned off, the diode 26, the diode 28, the body diode of the MOSFET 39, and the body diode of the MOSFET 41 constitute a bridge diode, and its rectifying action makes the circuit equal to the state where m=1 in the circuit shown in FIG. 16. Accordingly, similarly to the circuit shown in FIG. 15, it is possible to make the circuit shown in FIG. 19 function as a power factor improving converter.

By the way, a method of increasing a switching frequency is common in order to miniaturize such a power factor improving converter. By increasing the switching frequency, an inductance of the choke required to achieve the same ripple current decreases, thereby enabling the miniaturization of the choke.

However, disadvantages caused by increasing the switching frequency include an increase in switching loss, an increase in choke copper loss due to the increase in AC resistance of the choke coil, and an increase in choke iron loss due to the high frequency characteristics of the core. Since the increase in loss causes an increase in size of cooling components, there has been a problem that the miniaturization effect of the power factor improving converter achieved by increasing the switching frequency reaches a plateau.

Additionally, there is another problem that the conventional power factor improving converter has large common mode noise. The common mode noise is generated by a common mode current flowing into the ground. However, this common mode current is generated by a change in potential which occurs at the time a switch element such as a MOSFET is switched. In the case of MOSFETs, although the back of the element becomes a drain, the common mode current flows into the ground through a stray capacitance present between the drain and the ground. When $i_C$ represents the common mode current, $C_{STRAY}$ represents the stray capacitance, and dV/dt represents a time variation of the drain voltage with respect to the ground, $$i_C = C_{STRAY} \times \frac{dV}{dt} \qquad \text{[Equation 1]}$$

Accordingly, in order to reduce the common mode current $i_C$, three methods can be considered, such as reducing the stray capacitance $C_{STRAY}$, reducing dV, and increasing dt. If an insulator present between the drain and the ground is thickened in order to reduce the stray capacitance $C_{STRAY}$, however, there is a problem that the thermal resistance increases, thus causing an increase in temperature of the MOSFETs. dV is not changeable because it is determined from the circuit configuration that dV=±Vo. Additionally, when dt is increased, the switching loss increases, thus causing a problem that the temperature of the MOSFETs increases.

Thus, since it is not easy to reduce the common mode current, such a forcible measure as increasing the impedance of the noise filter is taken in some cases. In order to increase the impedance, however, there is a problem such that an expensive material has to be used, or a noise filter becomes larger in size.

DISCLOSURE OF THE INVENTION

Summary of the Invention

The present invention is to reduce the choke by a change in circuit configuration without increasing the switching frequency and thereby reduce the common mode current.

Problems to be Solved by the Invention

According to the conventional power factor improving converters, even if the miniaturization thereof is attempted to be made by increasing the switching frequency, there is a problem that the miniaturization effect reaches a plateau due to an increase in component loss.

Additionally, since the common mode current is large, there is a problem that a noise filter becomes larger in size.

Means for Solving the Problems

An n-level power factor improving converter of the present invention (n is an integer of 3 or more) is provided with (n−1) circuit blocks each including a first series circuit including a first rectifier element and a first switching element, a second series circuit including a second rectifier element and a second switching element, and a capacitor, wherein one input terminal is connected to a connecting point of the first rectifying element and the first switching element, another input terminal is connected to a connecting point of the second rectifying element and the second switching element, and output terminals are connected to both ends of the first series circuit, both ends of the second series circuits, and both ends of the capacitor. A choke and a series circuit formed by connecting the other input terminal and the one input terminal of adjacent ones of the plurality of circuit blocks are connected to the AC power supply. Output terminals of each of the plurality of circuit blocks are connected to a load.

Here, the choke may be connected anywhere between the respective ones of the plurality of circuit blocks, and may also be distributed in multiple points. Accordingly, the choke may be included in each of the plurality of circuit blocks.

Effects of the Invention

The power factor improving converter and the power supply device including the power factor improving converter of the present invention have the following effects.

First, the voltage applied to the choke decreases, and the apparent frequency increases, thereby enabling the miniaturization of the choke. This also enables miniaturization of the entire power supply device. This is because the input terminal voltage of each circuit block is selected in accordance with the instantaneous value of the input voltage, thereby enabling a reduction in voltage applied to the choke. This is also because the phase for switching the input terminal voltage of each circuit block is shifted, thereby increasing the apparent frequency for the choke, thus enabling a reduction in inductance required to achieve the same ripple current.

Second, the change in potential of the MOSFETs is reduced, thereby enabling a reduction in common mode current. dV shown in Equation 1 is ±Vo in the conventional circuit, while dV becomes ±Vo/(n−1) in the power factor improving converter of the present invention. This is because the voltage at the output terminal of each circuit block is controlled to be Vo/(n−1), thereby making the voltage applied to the MOSFETs be Vo/(n−1) rather than Vo. Accordingly, the common mode current is becomes 1/(n−1) of that of the conventional circuit. Thereby, the common mode noise can be reduced without paying the price, such as an increase in heat resistance or an increase in switching loss, thereby enabling the miniaturization of the noise filter.

MODE FOR CARRYING OUT THE INVENTION

A mode for carrying out the present invention is apparent if the following description of preferred examples is read with reference to the accompanying drawings. However, the drawings are exclusively for the illustration purpose and do not limit the technical scope of the present invention.

Figure 1:
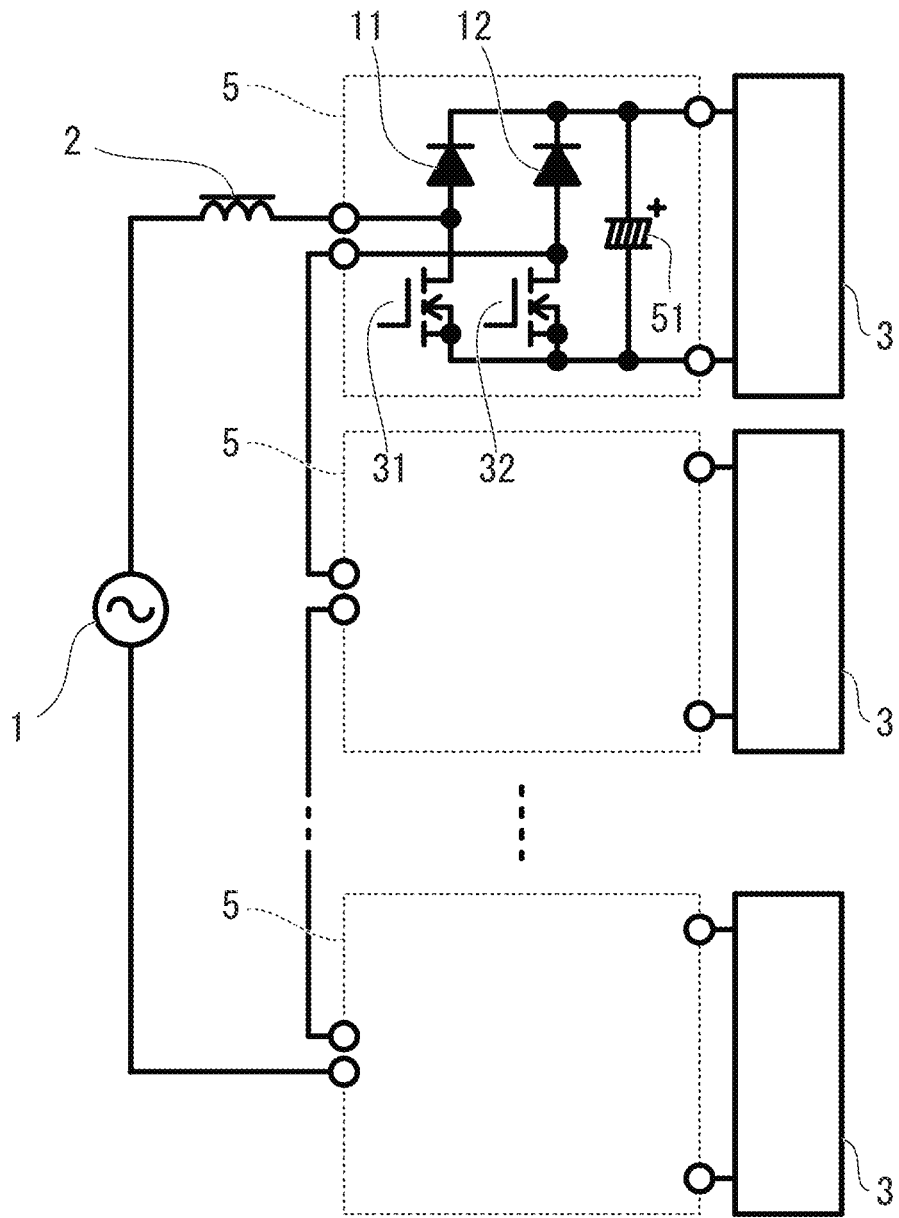
FIG. 1 shows one example of an n-level power factor improving converter of the present invention.

An n-level power factor improving converter of the present invention (n is an integer of 3 or more) includes an AC power supply 1, a choke 2, (n−1) circuit blocks 5, and loads 3 each connected to output terminals of one of the circuit blocks 5, as shown in FIG. 1.

Each circuit block 5 includes a first series circuit including a diode 11 and a MOSFET 31, a second series circuit including a diode 12 and a MOSFET 32, and a capacitor 51. A drain of the MOSFET 31 and an anode of the diode 11 are connected, and a drain of the MOSFET 32 and an anode of the diode 12 are connected. One input terminal is connected to a connecting point of the diode 11 and the MOSFET 31, and the other input terminal is connected to a connecting point of the diode 12 and the MOSFET 32. A cathode of the diode 11 and a cathode of the diode 12 are connected to one end of the capacitor 51, a source of the MOSFET 31 and a source of the MOSFET 32 are connected to the other end of the capacitor 51, and further each load 3 is connected via the output terminals to both ends of the capacitor 51.

The input terminals of the respective circuit blocks 5 are connected in series. Specifically, the AC power supply 1 is connected via the choke 2 between one input terminal of the first circuit block 5 and the other input terminal of the (n−1)-th circuit block 5. The other input terminal and one input terminal of the adjacent circuit blocks 5 are connected. For example, the other input terminal of the first circuit block 5 and one input terminal of the second circuit block 5 are connected. Here, "adjacent" need not be "physically adjacent" and "formally adjacent" suffices.

In the mode for carrying out the present invention and later-described examples, description is given with respect only to the configuration that the circuit block 5 includes the first series circuit including the diode 11 and the MOSFET 31, the second series circuit including the diode 12 and the MOSFET 32, and the capacitor 51, wherein the drain of the MOSFET 31 and the anode of the diode 11 are connected, and the drain of the MOSFET 32 and the anode of the diode 12 are connected.

However, without being limited thereto, for example, a configuration may be such that the cathode of the diode 11 and the source of the MOSFET 31 are connected, and the cathode of the diode 12 and the source of the MOSFET 32 are connected. In this case, the drain of the MOSFET 31 and the drain of the MOSFET 32 are connected to the other end of capacitor 51, and the anode of the diode 11 and the anode of the diode 12 are connected to one end of the capacitor 51.

Additionally, a configuration may be such that the first series circuit is a series circuit including two diodes, and the second series circuit is a series circuit including two MOSFETs. Further, a configuration may be such that both the first series circuit and the second series circuit are series circuits each including two MOSFETs.

Example 1

Configuration of Example 1

Figure 2:
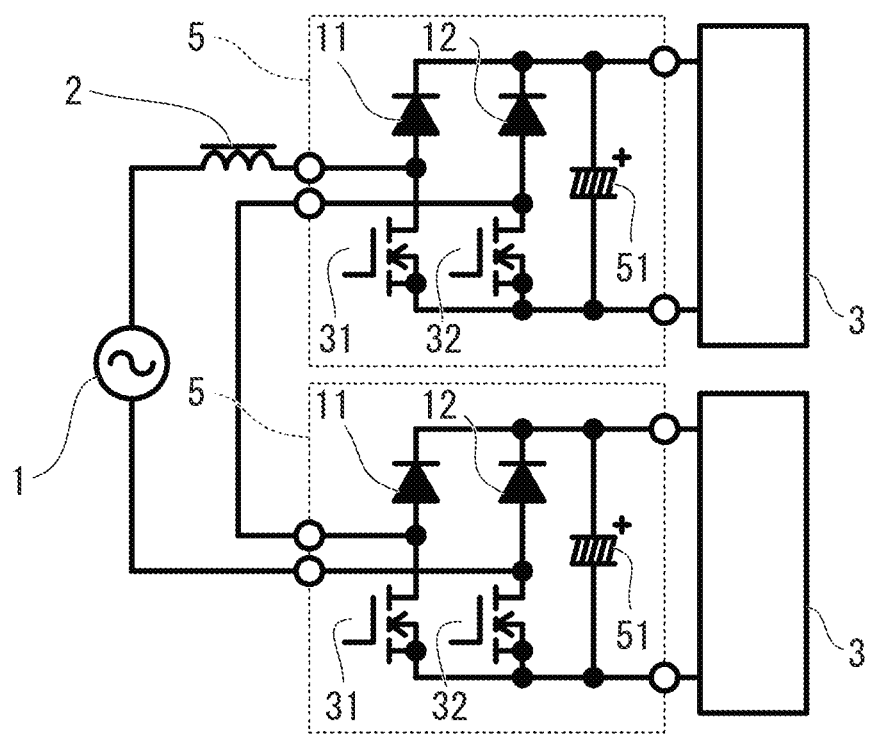
FIG. 2 shows one example of a 3-level power factor improving converter of the present invention.

FIG. 2 shows an example of the present invention where the number of levels n is 3. This converter includes the AC power source 1, the choke 2, the two circuit blocks 5, and the loads 3 each connected to the output terminals of one of the circuit blocks 5.

Each circuit block 5 includes the first series circuit including the diode 11 and the MOSFET 31, the second series circuit including the diode 12 and the MOSFET 32, and the capacitor 51. The drain of the MOSFET 31 and the anode of the diode 11 are connected, and the drain of the MOSFET 32 and the anode of the diode 12 are connected. One input terminal is connected to the connecting point of the diode 11 and the MOSFET 31, and the other input terminal is connected to the connecting point of the diode 12 and the MOSFET 32. The cathode of the diode 11 and the cathode of the diode 12 are connected to one end of the capacitor 51, the source of the MOSFET 31 and the source of the MOSFET 32 are connected to the other end of the capacitor 51, and further each load 3 is connected via the output terminals to both ends of the capacitor 51.

The input terminals of the first circuit block 5 and the input terminals of the second circuit block 5 are connected in series. Specifically, the AC power supply 1 is connected via the choke 2 between one input terminal of the first circuit block 5 and the other input terminal of the second circuit block 5. Additionally, the other input terminal of the first circuit block 5 and one input terminal of the second circuit block 5 are connected.

Operation of Example 1

Figure 18:
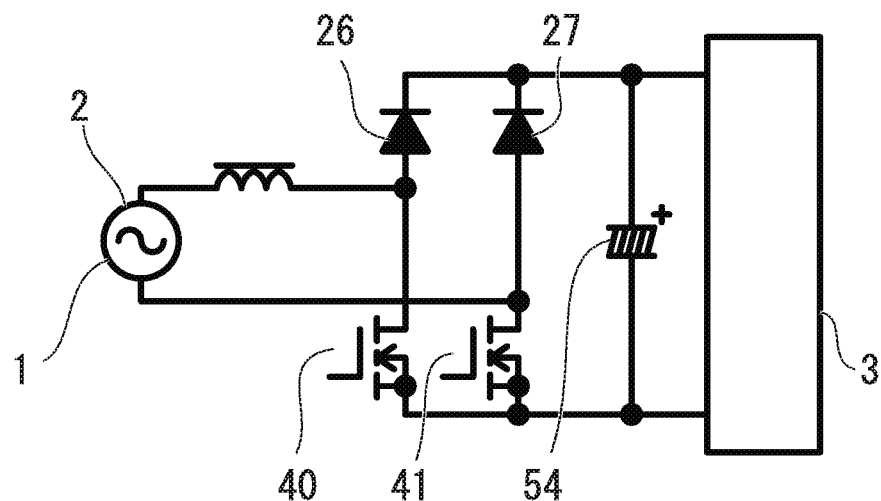
FIG. 18 shows a circuit diagram of a conventional power factor improving converter.
Figure 19:
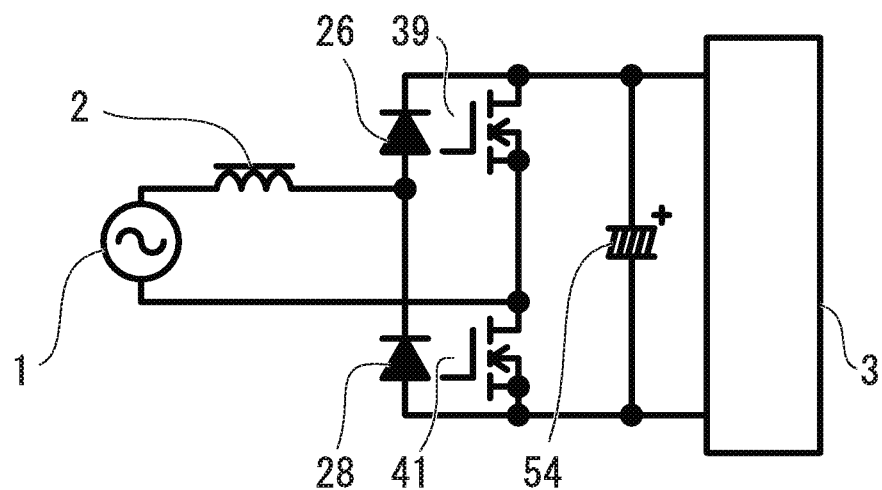
FIG. 19 shows a circuit diagram of a conventional power factor improving converter.

In the thus-configured power factor improving converter of Example 1, an output voltage of each circuit block 5 is assumed to be controlled to be Vo/2. Since the configuration of each circuit block 5 is similar to that of the circuit of FIG. 18, the voltage between the input terminals of each circuit block 5 is selectable from the states of 0 and ±Vo/2 by on-off of the MOSFETs 31 and 32. Since the input terminals of each circuit block 5 are connected in series, as a whole, the voltage is selectable from the states of 0, ±Vo/2, and ±Vo.

Figure 3:
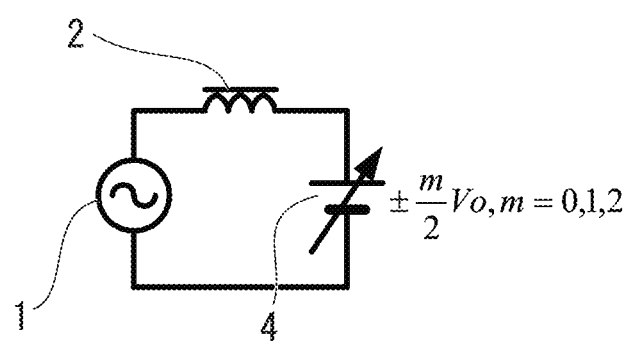
FIG. 3 shows an equivalent circuit of FIG. 2 focusing on a change in voltage of a choke.
Figure 16:
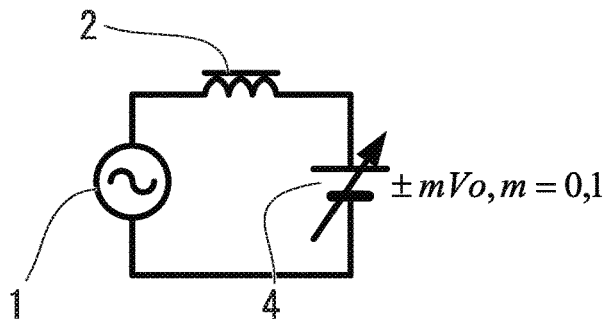
FIG. 16 shows an equivalent circuit of FIGS. 15, 17, 18, and 19 focusing on a change in voltage of the choke.
Figure 17:
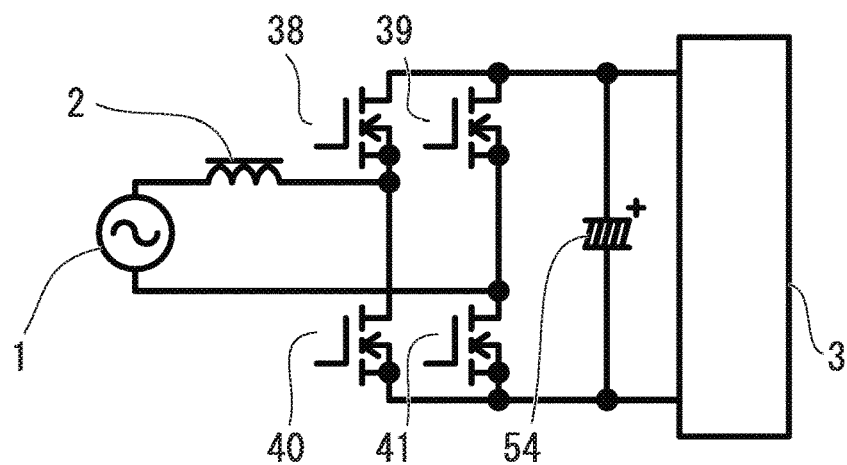
FIG. 17 shows a circuit diagram of a conventional power factor improving converter.

Accordingly, an equivalent circuit of FIG. 2 focusing on a change in voltage of the choke 2 will be a circuit shown in FIG. 3. This is the same as shown in FIG. 16, as a circuit, but values of the variable voltage source 4 differ therefrom such that coefficients of the voltage Vo include not only 0 and 1, but also newly-added ½. It is referred to as a "three-level" because there are such three voltage levels.

Thus, the coefficients of the voltage Vo including not only 0 and 1, but also newly-added ½, thereby enabling a reduction in voltage applied to the choke 2. For example, it is preferable that 0 and ½ are selected when the instantaneous value of the AC power supply 1 is low, while ½ and 1 are selected when the instantaneous value of the AC power supply 1 is high.

Additionally, the switching of the voltage between the input terminals is performed by shifting the phase, thereby enabling an increase in apparent frequency for the choke 2.

For example, when 0 and ½ are selected, it is preferable to switch, as follows.

First circuit block: 0 Second circuit block 2: 0
First circuit block: ½ Second circuit block 2: 0
First circuit block: 0 Second circuit block 2: 0
First circuit block: 0 Second circuit block 2: ½ Although each circuit block 5 is subject to the switching once, switching as a whole is performed twice such as 0, ½, 0, ½.

Accordingly, the inductance required to achieve the same ripple current decreases.

Figure 4:
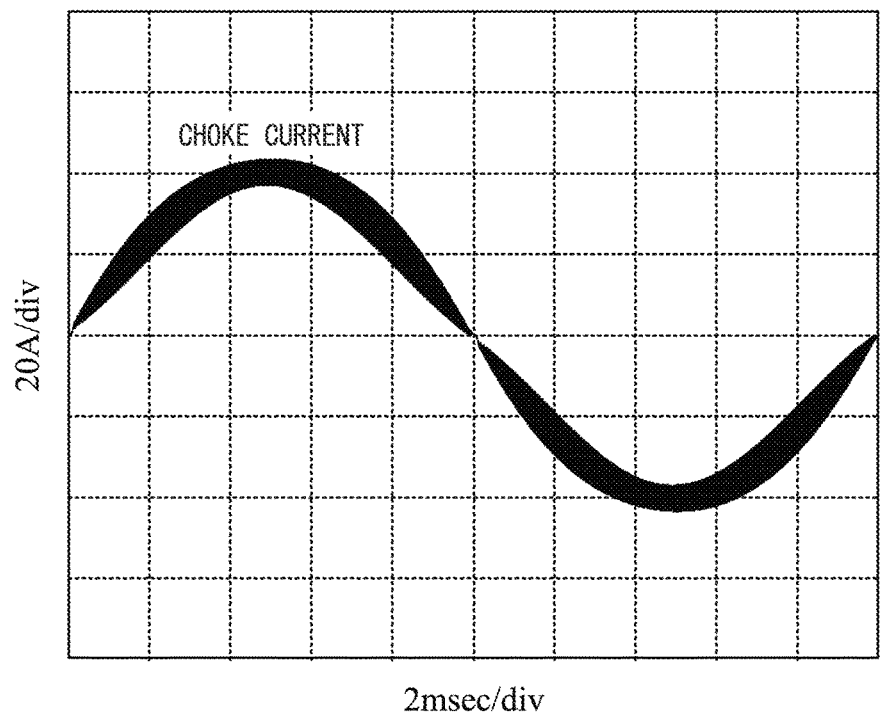
FIG. 4 shows a waveform of a current of a choke of a conventional circuit.
Figure 5:
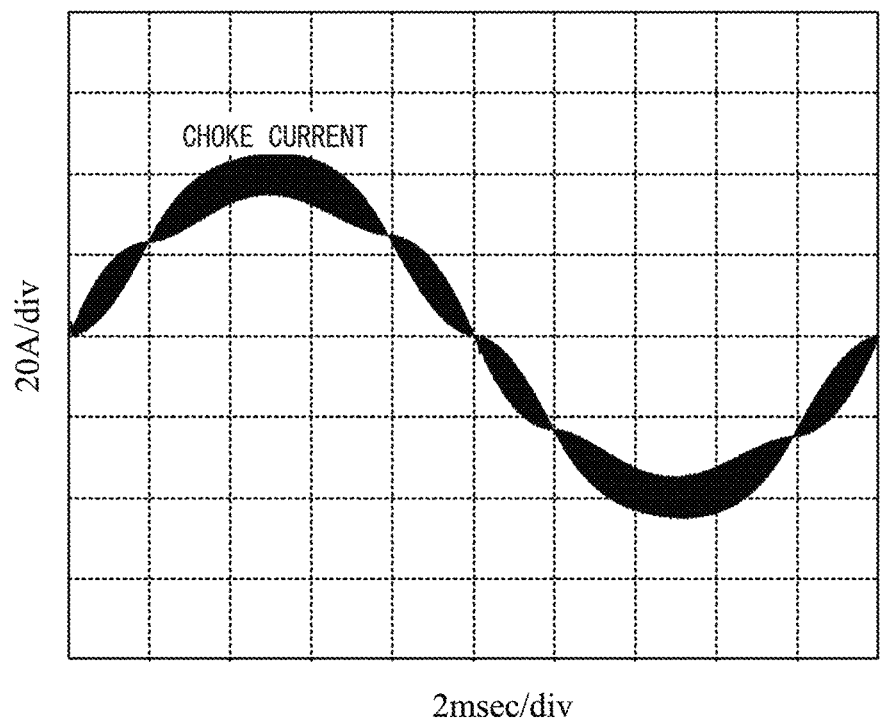
FIG. 5 shows a waveform of a current of a choke of the present invention.

A waveform of a current of the choke 2 of the conventional circuit is shown in FIG. 4, while a waveform of a current of the choke 2 of Example 1 is shown in FIG. 5. The current waveform shown here is a simulation result in a case where the input voltage is 240V, the output voltage is 400V (each 200V in Example 1), the load resistance is 24 Ωohms (each 12Ω in Example 1), and the switching frequency is 90 kHz. The difference is the inductance of the choke which is 100 μH in the conventional circuit, and 25 μH in Example 1.

Although both the current waveform shown in FIG. 4 and the current waveform shown FIG. 5 are displayed at 20 A/div and 2 msec/div, it is understandable that both indicate substantially the same ripple current despite the difference in inductance. In this example, the inductance was reduced to ¼, thus enabling substantial miniaturization of the choke.

Figure 6:
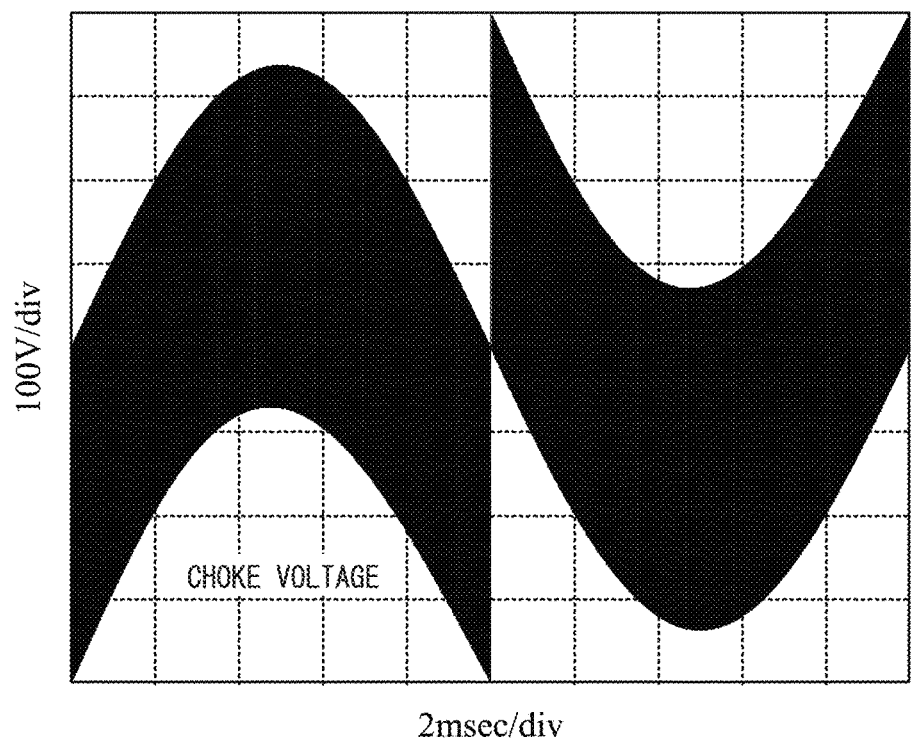
FIG. 6 shows a waveform of a voltage of the choke of the conventional circuit.
Figure 7:
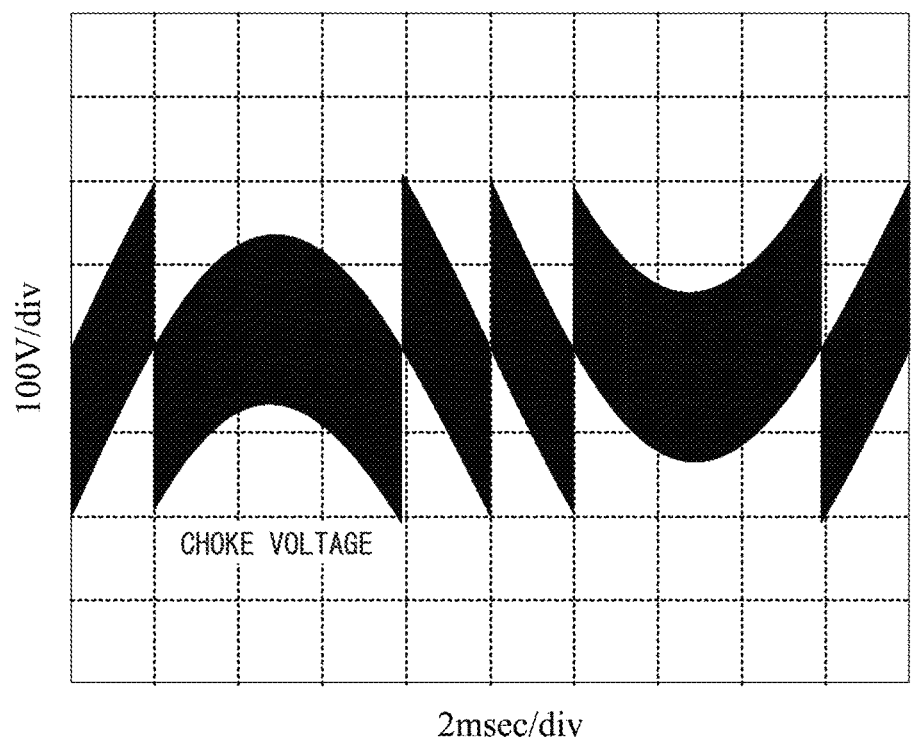
FIG. 7 shows a waveform of a voltage of the choke of the present invention.

A waveform of a voltage of the choke 2 of the conventional circuit is shown in FIG. 6, while the waveform of a voltage of the choke 2 of Example 1 is shown in FIG. 7. In the conventional circuit, the input voltage and (input voltage−output voltage) are applied to the choke 2, so that the voltage of ±400V is applied at the maximum. On the other hand, in Example 1, the input voltage and (input voltage−the output voltage÷2) are applied when the input voltage is low, while (input voltage−output voltage÷2) and (input voltage−the output voltage) are applied when the input voltage is high, so that the voltage is suppressed to ±200V.

Figure 8:
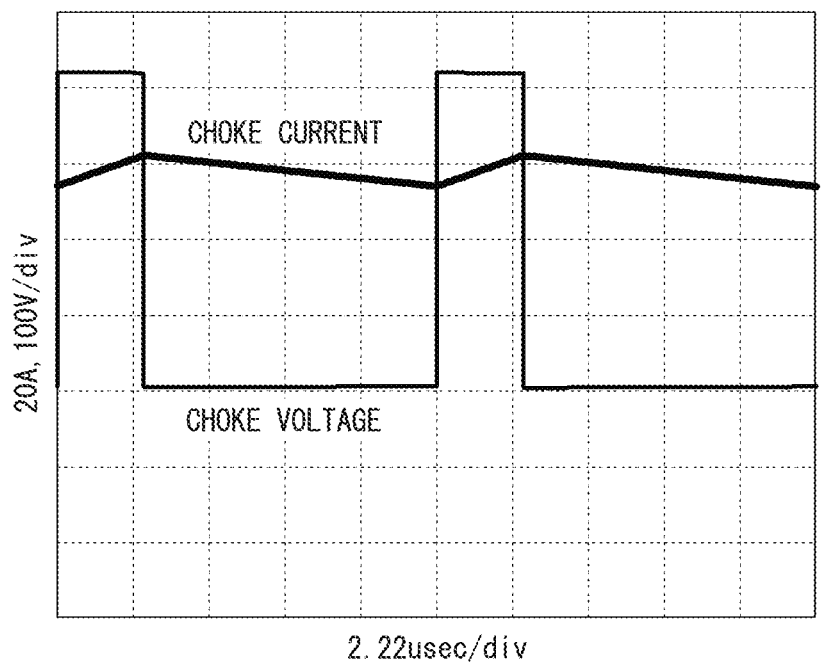
FIG. 8 shows a choke current waveform and a choke voltage waveform of the conventional circuit.
Figure 9:
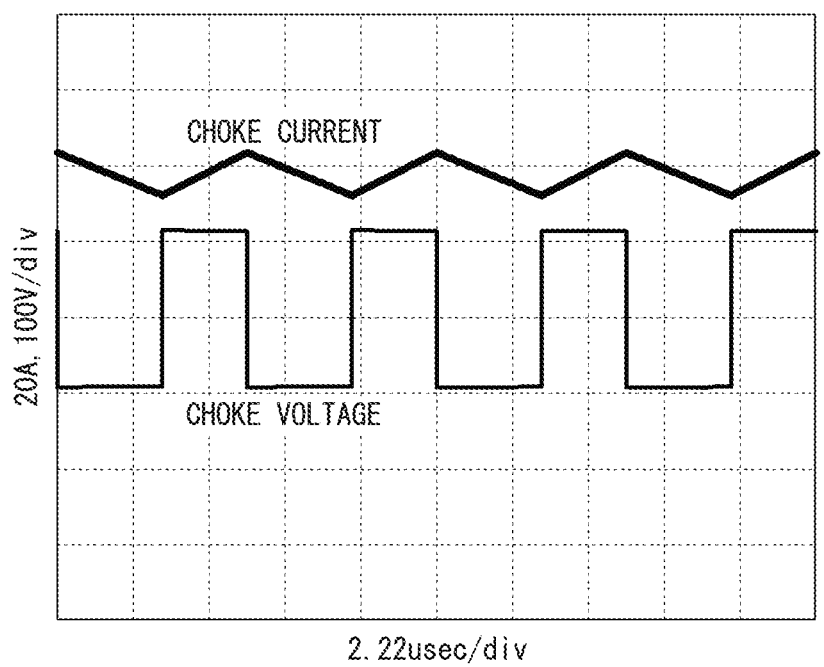
FIG. 9 shows a choke current waveform and a choke voltage waveform of the present invention.

Waveforms obtained by enlarging the waveforms shown in FIGS. 4, 5, 6, and 7 from 6 msec by 2 switching cycles are shown in FIG. 8 and FIG. 9. FIG. 8 is a waveform of the conventional circuit where the applied voltage is high, and there is a change in voltage once per cycle. On the other hand, FIG. 9 is a waveform of Example 1 where the applied voltage is kept low, there are changes in voltage twice in one cycle. Thus, as a choke, the applied voltage decreases and the frequency increases, and therefore the inductance required to achieve the same ripple current decreases.

Additionally, since the voltage of Vo/2 is applied to each of the MOSFETs 31 and 32, dV of Equation 1 becomes ±Vo/2, and the common mode current becomes ½ of that of the conventional circuit. Accordingly, it is possible to reduce more common mode noise than the conventional circuit can, thereby enabling the miniaturization of the noise filter.

Effect of Example 1

By the above action, it is possible to, by use of the circuit of the present invention, miniaturize the choke and also miniaturize the noise filter.

Example 2

Configuration of Example 2

Figure 10:
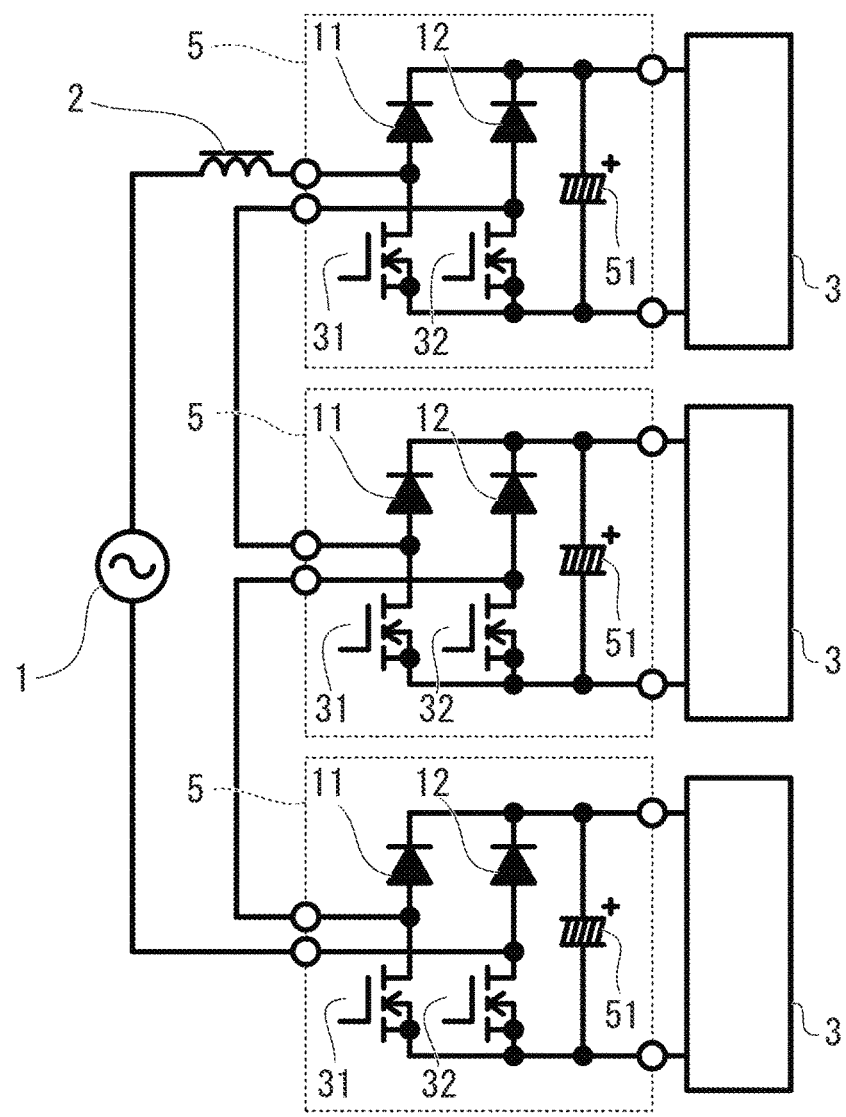
FIG. 10 shows an example of a 4-level power factor improving converter of the present invention.

FIG. 10 shows an example of the present invention where the number of levels n is 4. This converter includes the AC power source 1, the choke 2, the three circuit blocks 5, and the loads 3 each connected to the output terminals of one of the circuit blocks 5.

Each circuit block 5 includes the first series circuit including the diode 11 and the MOSFET 31, the second series circuit including the diode 12 and the MOSFET 32, and the capacitor 51. The drain of the MOSFET 31 and the anode of the diode 11 are connected, and the drain of the MOSFET 32 and the anode of the diode 12 are connected. One input terminal is connected to the connecting point of the diode 11 and the MOSFET 31, and the other input terminal is connected to the connecting point of the diode 12 and the MOSFET 32. The cathode of the diode 11 and the cathode of the diode 12 are connected to one end of the capacitor 51, while the source of the MOSFET 31 and the source of the MOSFET 32 are connected to the other end of the capacitor 51, and further each load 3 is connected via the output terminals to both ends of the capacitor 51.

The input terminals of the three circuit blocks 5 are connected in series. Specifically, the AC power supply 1 is connected via the choke 2 between one input terminal of the first circuit block 5 and the other input terminal of the third circuit block 5. Additionally, the other input terminal of the first circuit block 5 and one input terminal of the second circuit block 5 are connected. Further, the other input terminal of the second circuit block 5 and one input terminal of the third circuit block 5 are connected.

Operation of Example 2

In the thus-configured power factor improving converter of Example 2, an output voltage of each circuit block 5 is assumed to be controlled to be Vo/3. Since the configuration of each circuit block 5 is similar to that of the circuit of FIG. 18, the voltage between the input terminals of each circuit block 5 is selectable from the states of 0 and ±Vo/3 by on-off of the MOSFETs 31 and 32. Since the input terminals of each circuit block 5 are connected in series, as a whole, the voltage is selectable from the states of 0, ±Vo/3, ±Vo×⅔, and ±Vo.

Figure 11:
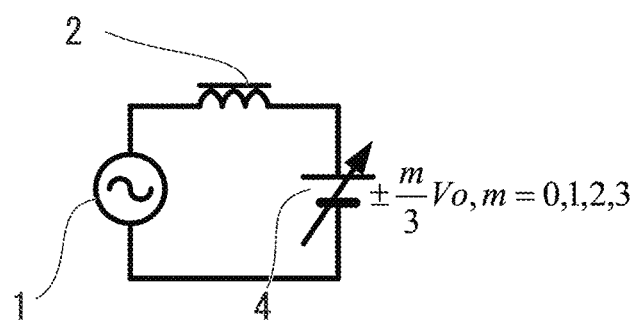
FIG. 11 shows an equivalent circuit of FIG. 10 focusing on a change in voltage of the choke.

Accordingly, an equivalent circuit of the circuit shown in FIG. 10 focusing on a change in voltage of the choke 2 will be a circuit shown in FIG. 11. This is the same as the circuit shown in FIG. 16, as a circuit, but values of the variable voltage source 4 differ therefrom such that coefficients of the voltage Vo include not only 0 and 1, but also newly-added ⅓ and ⅔. It is referred to as a "four-level" because there are such four voltage levels.

Thus, the coefficients of the voltage Vo including not only 0 and 1, but also newly-added ⅓ and ⅔, thereby enabling a reduction in voltage applied to the choke. For example, it is preferable that 0 and ⅓ are selected when the instantaneous value of the AC power supply 1 is low, while ⅓ and ⅔ are selected when the instantaneous value of the AC power supply 1 is mediate, while ⅔ and 1 are selected when the instantaneous value of the AC power supply 1 is high.

Additionally, the switching of the voltage between the input terminals is performed by shifting the phase, thereby enabling an increase in apparent frequency for the choke 2.

For example, when 0 and ⅓ are selected, it is preferable to switch, as follows.

First circuit block: 0    Second circuit block: 0    Third circuit block: 0
First circuit block: ⅓    Second circuit block: 0    Third circuit block: 0
First circuit block: 0    Second circuit block: 0    Third circuit block: 0

| First circuit block: 0 | Second circuit block: ⅓ | Third circuit block: 0 |
| First circuit block: 0 | Second circuit block: 0 | Third circuit block: 0 |
| First circuit block: 0 | Second circuit block: 0 | Third circuit block: ⅓ |

Although each circuit block 5 is subject to the switching once, switching as a whole is performed three times such as 0, ⅓, 0, ⅓, 0, ⅓.

Accordingly, the inductance required to achieve the same ripple current decreases.

Thus, since the fact that the coefficients of the voltage Vo include not only 0 and 1, but also newly-added ⅓ and ⅔ is equal to that as a choke, the applied voltage decreases and the frequency increases, the inductance required to achieve the same ripple current decreases. This is similar to Example 1. However, since the voltage amplitude of Vo has been reduced from ½ to ⅓, and the number of switching has been increased from twice to three times, the required inductance further decreases in Example 2 than in Example 1.

Additionally, since the voltage of Vo/3 is applied to each of the MOSFETs, dV of Equation 1 becomes ±Vo/3, and the common mode current becomes ⅓ of that of the conventional circuit. Accordingly, it is possible to reduce more common mode noise in Example 2 than in Example 1, thereby enabling the miniaturization of the noise filter.

Effect of Example 2

By the above action, it is possible to, by use of the circuit of the present invention, miniaturize the choke and also miniaturize the noise filter.

Example 3

Configuration of Example 3

In Example 3, as the loads for the respective circuit blocks 5 of the circuit shown in FIG. 2, primary sides of full-bridge converters 6 (hereinafter referred to as "converters 6") are respectively connected, as in a circuit shown in FIG. 12, and outputs of the respective converters 6 are connected to each other and to the load 3.

In each converter 6, inputs of a bridge circuit including a MOSFET 33, a MOSFET 34, a MOSFET 35, and a MOSFET 36 are connected to the output terminals of each circuit block 5. Outputs of this bridge circuit are connected to a primary winding of a transformer 61. A secondary winding of the transformer 61 is connected to a rectifying circuit including a diode 13, a diode 14, a diode 15, and a diode 16 which are bridged. Outputs of the rectifying circuit are connected to a smoothing circuit including a choke 8 and a capacitor 52.

Operation of Example 3

The converter 6, by the MOSFET 33, the MOSFET 34, the MOSFET 35, and the MOSFET 36, provides a positive and negative voltage to the primary winding of the transformer 61. Then, a voltage which appears in the secondary winding of the transformer 61 is rectified by the diode 13, the diode 14, the diode 15, and the diode 16. Then, the voltage and current are smoothed by the choke 8 and the capacitor 52.

Additionally, in such a case where the outputs of the plurality of converters 6 are connected to each other, it is known that the ripple current of the capacitor 52 can be reduced by shifting the phases with each other to drive the converters, which are generally called multi-phase converters.

Effect of Example 3

Thus, the outputs of the respective converters 6 are connected with each other, thereby realizing, as a whole, a single-input single-output isolated converter with the power factor improving function.

Additionally, each converter 6 is driven while shifting the phases of each converter 6, thereby enabling a reduction in ripple current of the capacitor 52, and thus enabling the miniaturization of the capacitor 52.

Here, although the example of the full-bridge converter has been taken in the Example 3, a circuit type of the converter 6 is not limited thereto as long as the converter 6 is an isolated converter, thereby still achieving the same effect that, as a whole, a single-input single-output isolated converter with the power factor improving function can be realized by connecting the outputs of the respective converters 6.

Additionally, although the example of the parallel connection has been taken as the method of connecting the outputs of the respective converters 6, even if this is replaced with a series connection, it is still possible to achieve the same effect that, as a whole, a single-input single-output isolated converter with the power factor improving function can be realized by connecting the outputs of the respective converters 6.

Example 4

Configuration of Example 4

Figure 12:
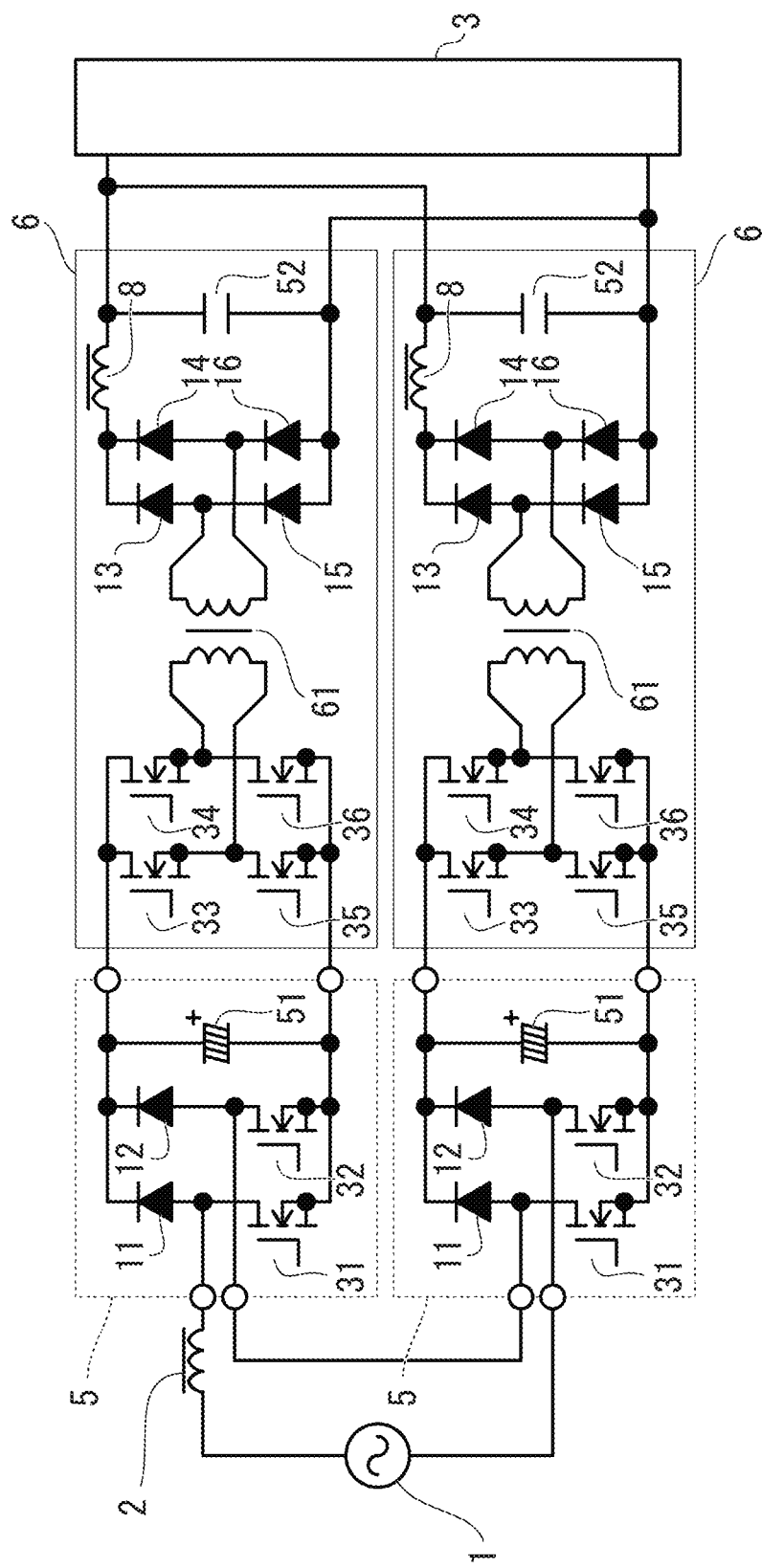
FIG. 12 shows an example where an isolated converter is connected as a load of FIG. 2.
Figure 13:
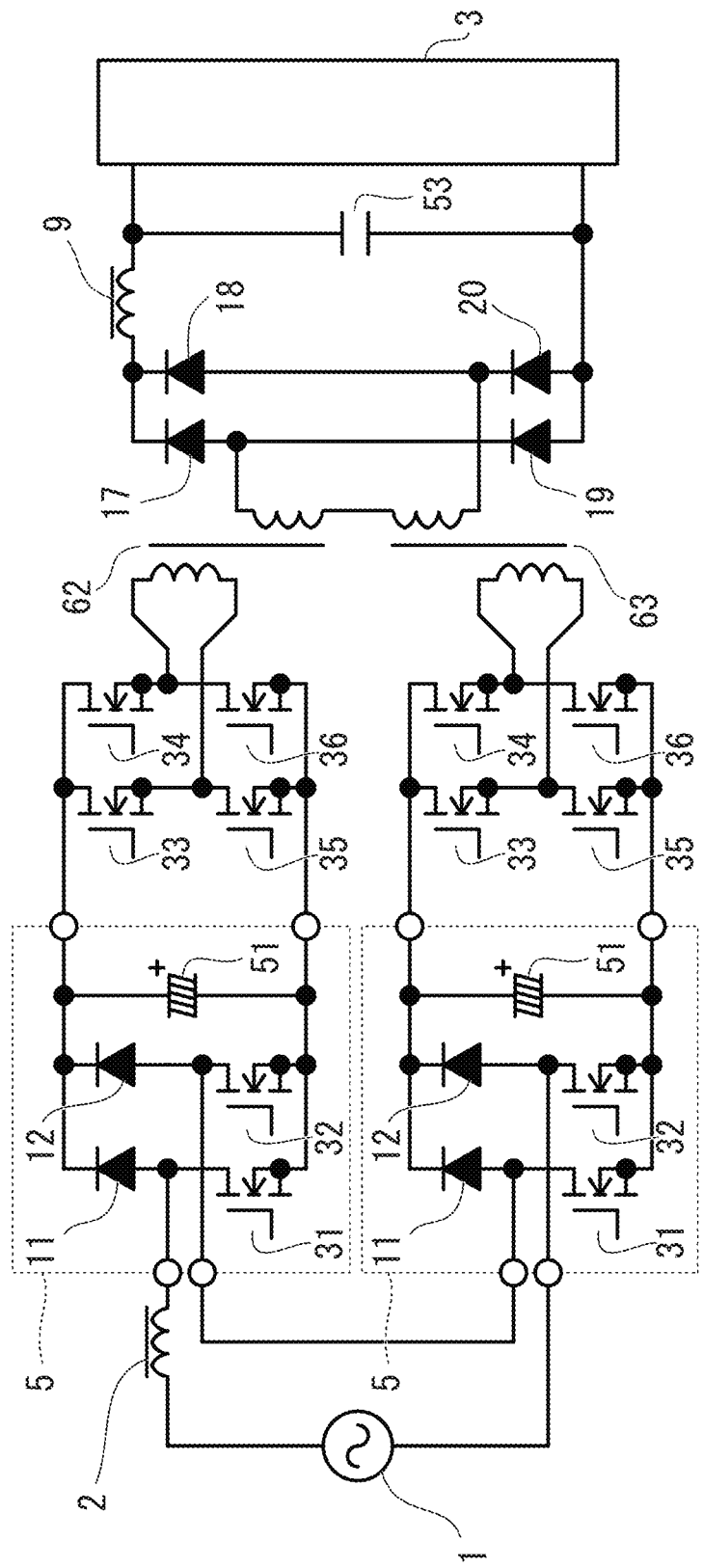
FIG. 13 shows an example where an isolated converter is connected as the load of FIG. 2.

FIG. 13 shows another example of converters to be connected as the loads for the respective circuit blocks. Here, the same components as those of the circuit shown in FIG. 12 are represented by the same symbols.

In each converter, inputs of the bridge circuit including the MOSFET 33, the MOSFET 34, the MOSFET 35, and the MOSFET 36 are connected to the output terminals of each circuit block 5. Outputs of this bridge circuit are connected to primary windings of a transformer 62 and a transformer 63. Secondary windings of the transformers 62 and 63 are connected in series. The series circuit including the secondary windings is connected to a rectifying circuit including a diode 17, a diode 18, a diode 19, and a diode 20 which are bridge-configured. Outputs of the rectifying circuit are connected to a smoothing circuit including a choke 9 and a capacitor 53.

Operation of Example 4

Operation on the primary side is similar to that of the circuit shown in FIG. 12. The MOSFET 33, the MOSFET 34, the MOSFET 35, and the MOSFET 36 provide a positive and negative voltage to the primary windings of the transformers 62 and 63. Then, voltages which appear in the secondary windings of the transformers 62 and 63 are added by the series connection thereof. Then, the added voltages are rectified by the diode 17, the diode 18, the diode 19, and the diode 20. Then, the voltage and current are smoothed by the choke 9 and the capacitor 53.

Effect of Example 4

Since the voltages of the primary windings of the transformers 62 and 63 are selectable from the voltages of 0 and ±Vo/2, voltages obtained by turn ratio conversion of 0, ±Vo/2, and ±Vo appear in the series circuit including the secondary windings of the transformers 62 and 63. Here, Vo is a value obtained by adding the output voltages of the respective circuit blocks 5.

Accordingly, the same act as described with respect to the power factor improving converter appears, thereby enabling the miniaturization of the choke 9.

Here, although the example of the circuit using the four MOSFETs in the bridge configuration as the primary circuit of the converter has been taken in Example 4, another circuit may be used as long as a positive and negative voltage can be provided to the primary windings of the transformer 62 and 63, thereby achieving the same effect that the chokes 9 can be miniaturized.

Example 5

Configuration of Example 5

Figure 14:
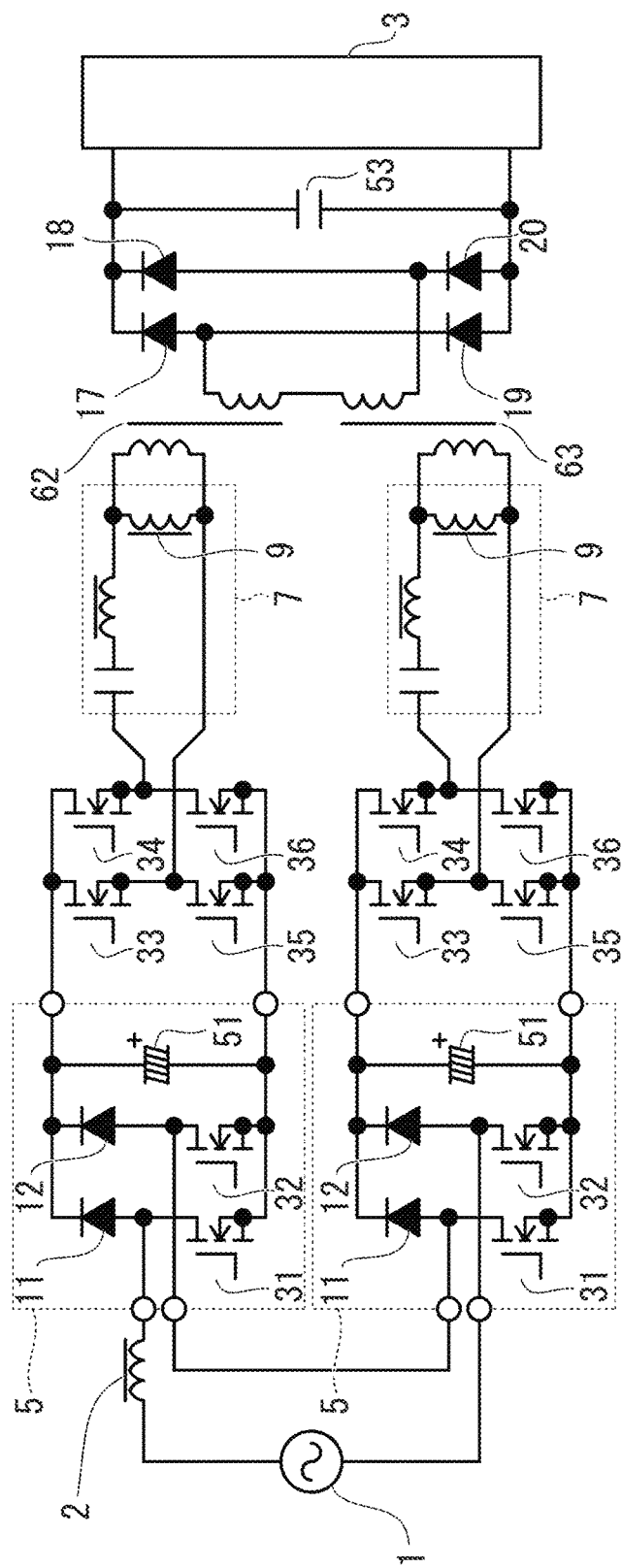
FIG. 14 shows an example where an isolated converter is connected as the load of FIG. 2.
Figure 15:
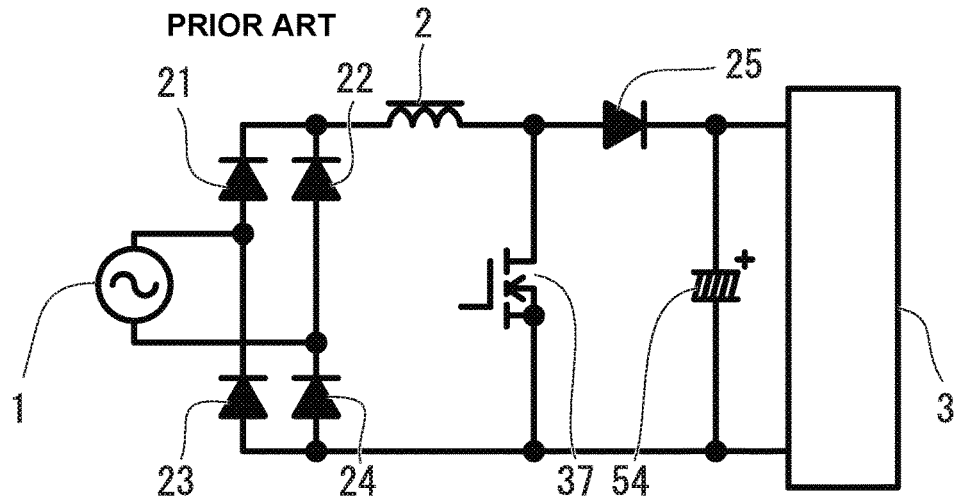
FIG. 15 shows a circuit diagram of a conventional power factor improving converter.

FIG. 14 shows another example of converters to be connected as the loads for the respective circuit blocks. Example 5 differs from Example 4 in that resonance circuits 7 are added, and chokes 9 are short-circuited.

Operation of Example 5

In the thus-constructed isolated DC/DC converter, outputs of two bridge circuits each including the MOSFET 33, the MOSFET 34, the MOSFET 35, and the MOSFET 36 are made equal, and the voltages of the secondary windings of the transformer 62 and 63 become half the voltage of the capacitor 53. Then, when an output of one bridge circuit is made zero, the voltage of the secondary winding of the other transformer 63 becomes equal to the voltage of the capacitor 53, and the voltage of the secondary winding of the one transformer 62 becomes zero. This makes it possible to switch the voltage of the resonant circuit 7 in a multilevel.

Effects of Example 5

Since it is possible to switch the voltage of the resonant circuit in a multilevel, the duty of each level is controlled, thereby enabling a control at a fixed frequency in spite of the resonant converter.

Additionally, the voltage of the resonant circuit is switched in a multilevel, thereby enabling the use of the rectifier diode always in the current discontinuous mode even if a ratio of the input voltage and the output voltage varies. As a result of this, the recovery current does not flow through the rectifier diode, thereby reducing the surge voltage and resulting in low noise.

Here, although the example using MOSFETs as the switching elements has been taken in the above description, the same effect can be achieved even if a parallel circuit including an IGBT and an antiparallel diode is used.

INDUSTRIAL APPLICABILITY

According to the present invention, the multilevel converter technology is applicable to non-isolated power factor improving converters, and particularly, is applicable to cascade multi-cell multilevel converters.

DESCRIPTION OF REFERENCE NUMERALS

1 AC power supply
2 choke
3 load
4 variable voltage source
5 circuit block
6 full-bridge converter
7 resonance circuit
8, 9 choke
11-28 diode
31-41 MOSFET
51-54 capacitor
61-63 transformer

The invention claimed is:

1. A power supply device comprising:
a plurality of circuit blocks each including
a first series circuit including a first rectifying element and a first switching element which are directly connected in series,
a second series circuit including a second rectifying element and a second switching element which are directly connected in series, and
a capacitor connected in parallel to the first series circuit and the second series circuit,
a first input terminal connected to a first direct connection point of the first rectifying element and the first switching element;
a second input terminal connected to a second direct connection point of the second rectifying element and the second switching element,
a first output terminal connected to a first end of the first series circuit, a first end of the second series circuit, and a first end of the capacitor,
a second output terminal connected to a second end of the first series circuit, a second end of the second series circuit, and a second end of the capacitor;
a plurality of converters each comprising:
a transformer including a primary winding at a primary side and a secondary winding at a secondary side different from the primary side;
a bridge circuit at the primary side comprising
a first series circuit including first and second switching elements directly connected in series, a first direct connection point of the first and second switching elements being connected directly to one end of the primary winding,
a second series circuit including third and fourth switching elements directly connected in series, a second direct connection point of the third and fourth switching elements being connected directly to another end of the primary winding,
a first output terminal connected to a first end of the first series circuit and a first end of the second series circuit, and
a second output terminal connected to a second end of the first series circuit and a second end of the second series circuit and
a rectifying circuit at the secondary side comprising
a third series circuit including first and second rectifying elements directly connected in series, a third direct connection point of the first and second rectifying elements being connected directly to one end of the secondary winding,
a fourth series circuit including third and fourth rectifying elements directly connected in series, a fourth direct connection point of the third and fourth rectifying elements being connected directly to another end of the secondary winding, and a first capacitor connected in parallel to the third series circuit and the fourth series circuit a load having a first end connected to a first end of the third series circuit of each of the plurality of converters, a first end of the fourth series circuit of each of the plurality of converters, and a first end of the first capacitor of each of the plurality of converters, and a second end connected to a second end of the third series circuit of each of the plurality of converters, a second end of the fourth series circuit of each of the plurality of converters, and a second end of the first capacitor of each of the plurality of converters; and an AC power supply having a first end connected to the first input terminal of a first circuit block of the plurality of circuit blocks, and a second end connected to the second input terminal of a second circuit block of the plurality of circuit blocks, the second circuit block being different from the first circuit block; and a choke connected between the first input terminal of the first circuit block and the first end of the AC power supply, wherein the first and second input terminals of each of the plurality of circuit blocks, the AC power supply, and the choke are connected in series.

2. A power supply device comprising:

a plurality of circuit blocks each including a first series circuit including a first rectifying element and a second rectifying element which are directly connected in series, a second series circuit including a first switching element and a second switching element which are directly connected in series, and a capacitor connected in parallel to the first series circuit and the second series circuit, a first input terminal connected to a first direct connection point of the first rectifying element and the second rectifying element;

a second input terminal connected to a second direct connection point of the first switching element and the second switching element, a first output terminal connected to a first end of the first series circuit, a first end of the second series circuit, and a first end of the capacitor, a second output terminal connected to a second end of the first series circuit, a second end of the second series circuit, and a second end of the capacitor;

a plurality of converters each comprising:

a transformer including a primary winding at a primary side and a secondary winding at a secondary side different from the primary side;

a bridge circuit at the primary side comprising a first series circuit including first and second switching elements directly connected in series, a first direct connection point of the first and second switching elements being connected directly to one end of the primary winding, a second series circuit including third and fourth switching elements directly connected in series, a second direct connection point of the third and fourth switching elements being connected directly to another end of the primary winding, a first output terminal connected to a first end of the first series circuit and a first end of the second series circuit, and a second output terminal connected to a second end of the first series circuit and a second end of the second series circuit; and a rectifying circuit at the secondary side comprising a third series circuit including first and second rectifying elements directly connected in series, a third direct connection point of the first and second rectifying elements being connected directly to one end of the secondary winding, a fourth series circuit including third and fourth rectifying elements directly connected in series, a fourth direct connection point of the third and fourth rectifying elements being connected directly to another end of the secondary winding, and a first capacitor connected in parallel to the third series circuit and the fourth series circuit a load having a first end connected to a first end of the third series circuit of each of the plurality of converters, a first end of the fourth series circuit of each of the plurality of converters, and a first end of the first capacitor of each of the plurality of converters, and a second end connected to a second end of the third series circuit of each of the plurality of converters, a second end of the fourth series circuit of each of the plurality of converters, and a second end of the first capacitor of each of the plurality of converters; and an AC power supply having a first end connected to the first input terminal of a first circuit block of the plurality of circuit blocks, and a second end connected to the second input terminal of a second circuit block of the plurality of circuit blocks, the second circuit block being different from the first circuit block;

a choke connected between the first input terminal of the first circuit block and the first end of the AC power supply, wherein the first and second input terminals of each of the plurality of circuit blocks, the AC power supply, and the choke are connected in series.

3. A power supply device comprising: a plurality of circuit blocks each including:

a first series circuit including a first switching element and a second switching element which are directly connected in series, a second series circuit including a third switching element and a fourth switching element which are directly connected in series, and a capacitor connected in parallel to the first series circuit and the second series circuit, a first input terminal connected to a first direct connection point of the first switching element and the second switching element;

a second input terminal connected to a second direct connection point of the third switching element and the fourth switching element, a first output terminal connected to a first end of the first series circuit, a first end of the second series circuit, and a first end of the capacitor, a second output terminal connected to a second end of the first series circuit, a second end of the second series circuit, and a second end of the capacitor;

a plurality of converters each comprising:
- a transformer including a primary winding at a primary side and a secondary winding at a secondary side different from the primary side;
- a bridge circuit at the primary side comprising
  - a first series circuit including first and second switching elements directly connected in series, a first direct connection point of the first and second switching elements being connected directly to one end of the primary winding,
  - a second series circuit including third and fourth switching elements directly connected in series, a second direct connection point of the third and fourth switching elements being connected directly to another end of the primary winding,
  - a first output terminal connected to a first end of the first series circuit and a first end of the second series circuit, and
  - a second output terminal connected to a second end of the first series circuit and a second end of the second series circuit; and
- a rectifying circuit at the secondary side comprising
  - a third series circuit including first and second rectifying elements directly connected in series, a third direct connection point of the first and second rectifying elements being connected directly to one end of the secondary winding,
  - a fourth series circuit including third and fourth rectifying elements directly connected in series, a fourth direct connection point of the third and fourth rectifying elements being connected directly to another end of the secondary winding, and
  - a first capacitor connected in parallel to the third series circuit and the fourth series circuit a load having
- a first end connected to a first end of the third series circuit of each of the plurality of converters, a first end of the fourth series circuit of each of the plurality of converters, and a first end of the first capacitor of each of the plurality of converters, and
- a second end connected to a second end of the third series circuit, a second end of the fourth series circuit, and a second end of the first capacitor of each of the plurality of converters; and an AC power supply having
- a first end connected to the first input terminal of a first circuit block of the plurality of circuit blocks, and
- a second end connected to the second input terminal of a second circuit block of the plurality of circuit blocks, the second circuit block being different from the first circuit block;
- a choke connected between the first input terminal of the first circuit block and the first end of the AC power supply, wherein the first and second input terminals of each of the plurality of circuit blocks, the AC power supply, and the choke are connected in series.

4. The power supply device according to claim 1, wherein at least one of the first and second switching elements includes a MOSFET.

5. The power supply device according to claim 1, wherein at least one of the first and second switching elements includes an IGBT and a rectifying element which are connected in parallel.

6. A power supply device comprising:
a plurality of converters each comprising
transformer including a winding at a primary side and a secondary winding at a secondary side different from the primary side,
a bridge circuit at the primary side comprising
  a first series circuit including first and second switching elements directly connected in series, a first direct connection point of the first and second switching elements being connected directly to one end of the primary winding,
  a second series circuit including third and fourth switching elements directly connected in series, a second direct connection point of the third and fourth switching elements being connected directly to another end of the primary winding,
  a first output terminal connected to a first end of the first series circuit and a first end of the second series circuit, and
  a second output terminal connected to a second end of the first series circuit and a second end of the second series circuit, and
a rectifying circuit at the secondary side comprising
  a third series circuit including first and second rectifying elements directly connected in series, a third direct connection point of the first and second rectifying elements being connected directly to one end of the secondary winding,
  a fourth series circuit including third and fourth rectifying elements directly connected in series, a fourth direct connection point of the third and fourth rectifying elements being connected directly to another end of the secondary winding, and
  a first capacitor connected in parallel to the third series circuit and the fourth series circuit, and
a load having
  a first end connected to a first end of the third series circuit of each of the plurality of converters, a first end of the fourth series circuit of each of the plurality of converters, and a first end of the first capacitor of each of the plurality of converters, and
  a second end connected to a second end of the third series circuit of each of the plurality of converters, a second end of the fourth series circuit of each of the plurality of converters, and a second end of the first capacitor of each of the plurality of converters.

7. The power supply device according to claim 6, wherein the plurality of converters are configured to shift respective phases thereof.

8. The power supply device according to claim 6, wherein the rectifying circuit further comprises:
a first choke having
  a first end connected to the first end of the third series circuit and the first end of the fourth series circuit, and
  a second end connected to the first end of the first capacitor and the first end of the load.

9. The power supply device according to claim 6, further comprising:
a plurality of circuit blocks each connected to one of the plurality of converters, each of the plurality of circuit blocks comprising
a seventh series circuit including a fifth rectifying element and a fifth switching element which are directly connected in series,
an eighth series circuit including a sixth rectifying element and a sixth switching element which are directly connected in series, a third capacitor connected in parallel to the seventh series circuit and the eighth series circuit, the third capacitor having
    a first end connected to a first end of the seventh series circuit, a first end of the eighth series circuit, and the first output terminal, and
    a second end connected to a second end of the seventh series circuit, a second end of the eighth series circuit, and the second output terminal,
a first input terminal connected to a fifth direct connection point of the fifth rectifying element and the fifth switching element, and
a second input terminal connected to a sixth direct connection point of the sixth rectifying element and the sixth switching element;
an AC power supply having
    a first end connected to the first input terminal of a first circuit block of the plurality of circuit blocks, and
    a second end connected to the second input terminal of a second circuit block of the plurality of circuit blocks, the second circuit block being different from the first circuit block; and
a second choke connected between the first input terminal of the first circuit block and the first end of the AC power supply,
wherein the first and second input terminals of each of the plurality of circuit blocks, the AC power supply, and the fourth choke are connected in series.

10. The power supply device according to claim 6, further comprising:
a plurality of circuit blocks each connected to one of the plurality of converters, each of the plurality of circuit blocks comprising
a seventh series circuit including a fifth rectifying element and a sixth rectifying element which are directly connected in series,
an eighth series circuit including a fifth switching element and a sixth switching element which are directly connected in series,
a third capacitor connected in parallel to the seventh series circuit and the eighth series circuit, the third capacitor having
    a first end connected to a first end of the seventh series circuit, a first end of the eighth series circuit, and the first output terminal, and
    a second end connected to a second end of the seventh series circuit, a second end of the eighth series circuit, and the second output terminal;
a first input terminal connected to a fifth direct connection point of the fifth rectifying element and the sixth rectifying element, and
a second input terminal connected to a sixth direct connection point of the fifth switching element and the sixth switching and element;
an AC power supply having
    a first end connected to the first input terminal of a first circuit block of the plurality of circuit blocks, and
    a second end connected to the second input terminal of a second circuit block of the plurality of circuit blocks, the second circuit block being different from the first circuit block; and
a fourth choke connected between the first input terminal of the first circuit block and the first end of the AC power supply,
wherein the first and second input terminals of each of the plurality of circuit blocks, the AC power supply, and the fourth choke are connected in series.

11. The power supply device of claim 6, further comprising:
a plurality of circuit blocks each connected to one of the plurality of converters,
wherein each of the plurality of circuit blocks comprises:
a seventh series circuit including a fifth switching element and a sixth switching element which are directly connected in series;
an eighth series circuit including a seventh switching element and an eighth switching element which are directly connected in series;
a third capacitor connected in parallel to the seventh series circuit and the eighth series circuit, the third capacitor having
    a first end connected to a first end of the seventh series circuit, a first end of the eighth series circuit, and the first output terminal, and
    a second end connected to a second end of the seventh series circuit, a second end of the eighth series circuit, and the second output terminal;
a first input terminal connected to a fifth direct connection point of the fifth switching element and the sixth switching element; and
a second input terminal connected to a sixth direct connection point of the seventh switching element and the eighth switching element, and
wherein the power supply device further comprises:
an AC power supply having
    a first end connected to the first input terminal of a first circuit block of the plurality of circuit blocks, and
    a second end connected to the second input terminal of a second circuit block of the plurality of circuit blocks, the second circuit block being different from the first circuit block; and
a second choke connected between the first input terminal of the first circuit block and the first end of the AC power supply,
wherein the first and second input terminals of each of the plurality of circuit blocks, the AC power supply, and the fourth choke are connected in series.

12. The power supply device according to claim 9, wherein at least one of the first and second switching elements includes a MOSFET.

13. The power supply device according to claim 9, wherein at least one of the first and second switching elements includes an IGBT and a rectifying element which are connected in parallel.

14. The power supply device according to claim 10, wherein at least one of the fifth and sixth switching elements includes a MOSFET.

15. The power supply device according to claim 10, wherein at least one of the fifth and sixth switching elements includes an IGBT and a rectifying element which are connected in parallel.

16. The power supply device according to claim 11, wherein at least one of the fifth to eighth switching elements includes a MOSFET.

17. The power supply device according to claim 11, wherein at least one of the fifth to eighth switching elements includes an IGBT and a rectifying element which are connected in parallel.

\* \* \* \* \*